US012778168B2

(12) United States Patent
Nakamura et al.

(10) Patent No.: US 12,778,168 B2
(45) Date of Patent: Nov. 3, 2026

(54) FLAVOR IMPARTING AGENT AND FLAVOR IMPARTING METHOD

(71) Applicant: NISSIN FOODS HOLDINGS CO., LTD., Osaka (JP)

(72) Inventors: Yumiko Nakamura, Osaka (JP); Takayoshi Aoki, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 264 days.

(21) Appl. No.: 18/552,136

(22) PCT Filed: Mar. 16, 2022

(86) PCT No.: PCT/JP2022/011869
§ 371 (c)(1),
(2) Date: Sep. 22, 2023

(87) PCT Pub. No.: WO2022/202525
PCT Pub. Date: Sep. 29, 2022

(65) Prior Publication Data

US 2024/0206513 A1 Jun. 27, 2024

(30) Foreign Application Priority Data

Mar. 25, 2021 (JP) ................................ 2021-052452

(51) Int. Cl.
*A23L 27/26* (2016.01)
*A23J 3/16* (2006.01)
*A23L 29/00* (2016.01)

(52) U.S. Cl.
CPC ................. *A23L 27/26* (2016.08); *A23J 3/16* (2013.01); *A23L 29/035* (2016.08)

(58) Field of Classification Search
CPC ............ A23L 27/26; A23L 29/035; A23J 3/16
See application file for complete search history.

(56) References Cited

U.S. PATENT DOCUMENTS

| | | | | |
|---|---|---|---|---|
| 10,039,306 B2 | 8/2018 | Vrljic et al. | | |
| 2015/0359241 A1* | 12/2015 | Okubo | .................... | A23L 27/10 426/534 |
| 2017/0290363 A1 | 10/2017 | Fraser et al. | | |

FOREIGN PATENT DOCUMENTS

| | | |
|---|---|---|
| JP | 2009-203438 | 9/2009 |
| JP | 6041937 B1 | 12/2016 |
| JP | 2017-018025 | 1/2017 |
| JP | 2017-079668 | 5/2017 |
| JP | 2018-000022 | 1/2018 |
| JP | 2019-076022 | 5/2019 |
| JP | 2020-078340 | 5/2020 |
| WO | 2014/167957 | 10/2014 |

OTHER PUBLICATIONS

Haraguchi et al. JP 2017018025 A. English Translation. (Year: 2017).*

Office Action received for Chinese Patent Application No. 202280020619.1, mailed on Apr. 16, 2025, 16 pages with translation.

Xu et al., "Effect of S Yeast Addition on Beef Paste", China Brewing Research Report, vol. 33, No. 11, Serial No. 273, Sep. 4, 2014, pp. 30-36 (with English translated Abstract).

Xiao-Yan et al., "Analysis and Study of the Desirable Precursor of the Chicken Flavor Based on PLSR", Modern Food Science and Technology, vol. 32, No. 10, Aug. 8, 2016, pp. 268-275 (with English translated Abstract).

International Search Report received for PCT Application No. PCT/JP2022/011869, mailed on May 10, 2022, with English translation, 5 pages.

Japanese Office Action dated Oct. 12, 2021n in Japanese Patent Application No. 2021-052452, with English translation, 7 pages.

Written Opinion received for PCT Application No. PCT/JP2022/011869, mailed on May 10, 2022, with English translation, 5 pages.

Extended European Search Report issued in Patent Application No. 22775314.2 issued on May 7, 2025, 9 pages.

* cited by examiner

*Primary Examiner* — Stephanie A Kohler
(74) *Attorney, Agent, or Firm* — Grüneberg Global IP, PLLC

(57) ABSTRACT

A novel fat aroma-imparting agent can be used for a food product using a plant protein as a raw material. The meat flavor of a food product using a plant protein can be enhanced by allowing (E)-6-nonenal to be contained therein. At the same time, the meat flavor can be further enhanced by using butanoic acid and/or delta-decalactone in combination therewith. A meat flavor-imparting agent for a plant protein-containing food product, containing (E)-6-nonenal; a method for producing a food product using a plant protein, by allowing (E)-6-nonenal to be contained therein; and a method for enhancing flavor, are provided.

11 Claims, No Drawings

FLAVOR IMPARTING AGENT AND FLAVOR IMPARTING METHOD

CROSS-REFERENCE TO RELATED APPLICATIONS

This application is the National Stage entry under § 371 of International Application No. PCT/JP2022/011869, filed on Mar. 16, 2022, and which claims the benefit of priority to Japanese Application No. 2021-052452, filed on Mar. 25, 2021. The content of each of these applications is hereby incorporated by reference in its entirety.

TECHNICAL FIELD

The present invention relates to, for example, a flavor-imparting agent that can be added to a food product using a plant protein as a raw material, thereby imparting meat flavor to the food product.

BACKGROUND ART

In various food products including processed food products, plant proteins such as soybean proteins may be utilized. Such plant proteins are considered increasingly important as meat alternatives because situations such as future shortage of meat raw materials are expected. Furthermore, the amount of the plant proteins used is increasing, and it is expected that even more plant proteins will be used.

Meanwhile, plant proteins and meat proteins differ in flavor or taste because of difference in organism species, amino acid composition, difference in associated fat or oil, and the like.

Under these circumstances, further utilization of plant proteins can be promoted if meat flavor can be effectively imparted to the plant proteins.

For example, a fermented seasoning composition described in Patent Literature 1 given below has been reported as a material that improves the flavor of plant protein.

CITATION LIST

Patent Literature

Patent Literature 1: Japanese Patent Laid-Open No. 2020-078340.

The fermented seasoning composition described above is a substance effective for masking odor unique to plant proteins. On the other hand, this composition does not actively impart the flavor of fat aroma of meat to plant proteins.

Hence, a method for imparting meat flavor, if any, is useful for plant proteins, also due to problems associated with meat alternatives.

SUMMARY OF INVENTION

Technical Problem

Accordingly, the inventors have aimed to develop a novel meat flavor-imparting agent for a food product using a plant protein as a raw material.

Solution to Problem

The inventors have repetitively conducted experiments on aroma components using various materials. As a result of diligent studies, the inventors have completed the present invention by finding that use of (E)-6-nonenal produces an effect of imparting meat flavor to a food product using a plant protein.

Specifically, the first aspect of the invention of the present application provides "a meat flavor-imparting agent for a plant protein-containing food product, comprising (E)-6-nonenal".

The present applicant also intends a plant protein-containing food product comprising (E)-6-nonenal. Specifically, the second aspect of the invention of the present application provides "a plant protein-containing food product comprising (E)-6-nonenal".

The plant protein-containing food product is preferably a food product of dry type. Specifically, the third aspect of the invention of the present application provides "the plant protein-containing food product according to claim 2, wherein the food product is a dry food product".

The present applicant also intends a method for producing a plant protein-containing food product, comprising the step of adding (E)-6-nonenal.

Specifically, the fourth aspect of the invention of the present application provides "a method for producing a plant protein-containing food product, comprising the step of adding (E)-6-nonenal".

The present applicant also intends a method for enhancing meat flavor by allowing (E)-6-nonenal to be contained in a food product using a plant protein. Specifically, the fifth aspect of the invention of the present application provides "a method for imparting meat flavor by allowing (E)-6-nonenal to be contained in a food product using a plant protein".

Advantageous Effects of Invention

Use of the meat flavor-imparting agent of the present invention can improve the meat flavor of various food products including a food product, particularly, a processed food product, using a plant protein.

DESCRIPTION OF EMBODIMENTS

Hereinafter, the mode for carrying out the present invention will be described in detail. However, the present invention is not limited by these embodiments. The active ingredient of the present invention is the following substance.

(E)-6-Nonenal

The (E)-6-nonenal (trans-6-nonenal) (CAS2277-20-5) described in the present invention has the following structural formula.

[Formula 1]

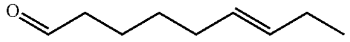

As for the (E)-6-nonenal (trans-6-nonenal) used in the present invention, a commercially available type can be obtained, for example, and can be used as a flavoring compound for a food product. The flavoring compound for a food product is designated by the Appended Table 1 of the Regulations for Enforcement of the Food Sanitation Act and is designated as a food additive that is used for the purpose of giving fragrance. The (E)-6-nonenal (trans-6-nonenal) among the flavoring compounds is included in specific articles judged as corresponding to 18 items of flavorings designated as compounds or derivatives (so-called group 18).

A commercially available type can be purchased as the (E)-6-nonenal (trans-6-nonenal) used in the present invention. Alternatively, a synthesized type may be used. Further, an extract of an aroma component obtained by extraction (distillation, etc.) from a food product or the like may be used.

In the case of using the present (E)-6-nonenal (trans-6-nonenal) in the production of a food product, a type in a state dissolved in a solvent such as a liquid fat or oil is preferably used.

—Plant Protein—

The plant protein described in the present invention refers to a protein that is contained in a plant. The plant protein has a small lipid content as compared with animal proteins (beef, pork, chicken, egg, fish, etc.) and is advantageous from the viewpoint of controlling a caloric intake. Another feature thereof is that the plant protein is easily added to various food products.

Typical examples of the plant protein include various proteins from beans such as soybean, pea, and broad bean and cereals such as corn, buckwheat, and wheat as raw materials. In addition, the plant protein is also contained in vegetables such as asparagus and broccoli and fruits such as avocado and banana, though contained in a relatively small amount in these plants themselves.

The plant protein described in the present invention typically refers to, but not limited to, a plant protein derived from any of beans such as soybean, pea, and broad bean and cereals such as corn, buckwheat, and wheat, and also includes plant proteins of vegetables and fruits.

Examples of the plant protein include types obtained from a state extracted or separated from the plants. However, the extraction may be rough extraction, not at a level of strict purification or the like, as a matter of course.

A plant such as soybean may be used as it is, or a plant protein contained in the plant may be used. A food product using the plant protein can be produced by various methods as described above.

Any of dry and wet types can be used as the plant protein. Particularly, in the case of using a plant protein of dry type, this plant protein may be temporarily mixed with water, and the resulting patty can be used.

—Plant Protein-Containing Food Product—

The plant protein-containing food product described in the present invention refers to a food product using the aforementioned plant protein as a raw material. The plant protein can be used as a portion of a raw material, and a raw material other than the plant protein may be contained therein. More specifically, the food product may contain, in addition to the plant protein, an animal protein (beef, pork, chicken, fish, etc.), a carbohydrate (cereals, vegetables, etc.), a lipid, a dietary fiber, a moisture, a mineral, a vitamin, a dye, a food additive, and the like.

The amount of the plant protein used in the plant protein-containing food product according to the present invention is not particularly limited. The plant protein is contained even in a small amount or a trace amount in the plant protein-containing food product, as a matter of course.

The plant protein-containing food product may be in any of solid and liquid forms, as a matter of course. Specific examples of the name of the food product using the plant protein include instant food products (instant noodles such as instant pot noodles and instant bag noodles, instant pot rice, instant soups, etc.).

Particularly, a dry ingredient (dry ingredient obtained by hot-air drying or freeze drying) partially using a plant protein such as a soybean protein may be used as an ingredient in instant noodles (instant pot noodles) or instant pot rice. The present invention can be suitably applied to such a dry ingredient.

The present invention can also be suitably applied to fake meat (hamburger patty, minced meat balls, etc.) using a plant protein such as a soybean protein and/or a pea protein.

A carbohydrate such as starch, an animal protein (beef, pork, chicken, etc.), seasonings such as salt, soy sauce, and sauce, and a spice may be used as other components constituting the dry ingredient or the fake meat, as a matter of course.

—Meat Flavor-Imparting Agent Containing (E)-6-nonenal (trans-6-nonenal)—

The present invention intends a meat flavor-imparting agent containing (E)-6-nonenal (trans-6-nonenal). The meat flavor-imparting agent includes every form as long as the meat flavor-imparting agent allows the (E)-6-nonenal (trans-6-nonenal) to be added to or contained in a plant protein-containing food product.

The food product may also contain various available components such as an additional flavoring other than the (E)-6-nonenal (trans-6-nonenal), various additives, and a spice, as a matter of course.

—Plant Protein-Containing Food Product Containing (E)-6-nonenal (trans-6-nonenal)—

The present invention also intends a plant protein-containing food product containing (E)-6-nonenal (trans-6-nonenal). In this context, the phrase "containing (E)-6-nonenal" in the plant protein-containing food product first includes the case of adding the (E)-6-nonenal at any stage of a process of producing the plant protein-containing food product.

When the plant protein-containing food product is of dry type, i.e., a dry food product, examples of the process of producing the plant protein-containing food product include a production process of subjecting a raw material including a plant protein to steps such as mixing→heating→drying to complete the process. In this case, the (E)-6-nonenal may be added at a raw material stage or may be added during mixing. Alternatively, the (E)-6-nonenal may be added before heating or may be added after heating.

Alternatively, for example, if an eater opens a supplied soup bag or the like and adds an attached flavor at the time of eating a processed food product such as instant noodles or instant rice, the (E)-6-nonenal may be contained in the soup bag or the like. The present invention includes every form as long as the plant protein-containing food product and the (E)-6-nonenal (trans-6-nonenal) are contained at the same time in the form at the time of eating.

Further, the (E)-6-nonenal (trans-6-nonenal) to be added does not have to be purified. The present invention includes every form as long as the (E)-6-nonenal (trans-6-nonenal) is contained as a portion of components in a flavoring, a food product material, or the like, as a matter of course.

—Meat Flavor—

The meat flavor described in the present invention typically refers to the fat aroma of meat. In this context, the fat aroma is greasy aroma unique to meat and is usually aroma that is strongly presented when a livestock product such as beef, pork, or chicken is cooked by heating. The meat flavor (fat aroma) described in the present invention typically refers to such smell. Distinctive meat-like richness can be imparted to the plant protein-containing food product by presenting the meat flavor (fat aroma).

—Flavor-Imparting Agent—

The flavor-imparting agent of the present invention imparts fat aroma which is the aforementioned meat flavor to a plant protein-containing food product used. If the plant protein-containing food product already has meat flavor through the use of a raw material such as meat, the flavor-imparting agent of the present invention increases the meat flavor and enhances the fat aroma.

Specifically, the term "imparting" in the flavor-imparting agent according to the present invention means imparting meat flavor to a product having no meat flavor and also means enhancing the meat flavor of a product having the meat flavor.

The flavor-imparting agent of the present invention can contain at least (E)-6-nonenal (trans-6-nonenal) and may contain other components such as various fats or oils, a solvent, a flavoring, and a seasoning, as a matter of course.

The dosage form of the flavor-imparting agent is not necessarily required to be a form that is stored in a container or the like of predetermined format. As long as a material (various food ingredients for additions, such as powders and granules) including at least (E)-6-nonenal (trans-6-nonenal) can be present in the production or the like of a plant protein-containing food product in order to enhance meat flavor, a form in which the material is added to or mixed with a plant protein-containing food product in the production of the plant protein-containing food product or at the time of eating falls into the flavor-imparting agent according to the present invention.

—Food Product Using Flavor-Imparting Agent of the Present Invention—

The flavor-imparting agent of the present invention can be added to various food products using a plant protein, thereby enhancing the meat flavor of the food product. The flavor-imparting agent can be used in, for example, fake meat in which a plant protein is partially or wholly used. Specifically, the flavor-imparting agent can be variously used in hamburger patty, minced meat balls, and the like. The flavor-imparting agent can be suitably used, particularly, in instant food products such as instant noodles (instant pot noodles and instant bag noodles), instant soups, and instant pot rice, which are processed food products. The flavor-imparting agent can also be suitably used in, for example, supplied soups (powdered soups and liquid soups) or supplied dry ingredients of these instant food products.

—Butanoic Acid—

The flavor-imparting agent for a plant protein-containing food product according to the present invention essentially contains (E)-6-nonenal (trans-6-nonenal) and preferably contains butanoic acid as an additional flavoring. The butanoic acid is a substance having unique smell and is contained in butter or cheese made of milk as a raw material.

—Delta-Decalactone—

The flavor-imparting agent for a plant protein-containing food product according to the present invention essentially contains (E)-6-nonenal (trans-6-nonenal) and preferably contains delta-decalactone as an additional flavoring. The delta-decalactone is a substance having unique smell and is contained in dairy products or fruits. The delta-decalactone may be used concurrently with the aforementioned butanoic acid.

—Concentration of Active Ingredient Blended into Flavor-Imparting Agent of Present Invention—

In the present invention, (E)-6-nonenal (trans-6-nonenal) is used as an essential constituent. The final concentration of the (E)-6-nonenal at the time of eating is preferably 0.01 ppt to 100 ppb, more preferably 1 ppt to 1 ppb, based on the weight of a plant protein-containing food product to be supplemented with the (E)-6-nonenal.

In the case of using butanoic acid or delta-decalactone in combination therewith, the concentration of the (E)-6-nonenal added is preferably 0.01 ppt to 100 ppb, more preferably 1 ppt to 1 ppb.

The amount of the butanoic acid used is in a concentration range on the order of basically $10^3$ times to $10^7$ times, more preferably $10^4$ times to $10^6$ times the final concentration of the (E)-6-nonenal (trans-6-nonenal) at the time of eating.

The amount of the delta-decalactone used is in a concentration range on the order of basically 1 time to 10000 times, more preferably 10 times to 1000 times the final concentration of the (E)-6-nonenal (trans-6-nonenal) at the time of eating.

—Method for Producing Food Product, Comprising Step of Allowing (E)-6-nonenal to be Contained—

The present invention also intends a method for producing a food product, comprising the step of allowing (E)-6-nonenal to be contained therein in a process of producing the food product for the purpose of enhancing the flavor of the plant protein. Specifically, a step including the step of allowing (E)-6-nonenal to be contained can be present as any step in a process of producing the food product, and the amount of the (E)-6-nonenal used is not limited.

—Method for Enhancing Meat Flavor by Allowing (E)-6-nonenal to be Contained—

The present invention also intends a method for enhancing meat flavor by allowing (E)-6-nonenal to be contained for the purpose of enhancing the meat flavor of a plant protein-containing food product.

EXAMPLES

Hereinafter, Examples of the present invention will be described. However, the present invention is not limited by these Examples.

[Test Example 1] Effect of (E)-6-nonenal on Various Plant Proteins (E)-6-Nonenal (CAS: 2277-20-5) was added to various plant proteins and examined for its effect. The commercially available plant proteins used were a powdered soybean protein, a powdered chickpea protein, a powdered pea protein, a powdered mug bean protein, and a powdered broad bean protein.

90 ml of water was added to 10 g each of the various plant proteins (100 g in total) and kneaded, and (E)-6-nonenal was added thereto at 100 ppt and further kneaded.

The smell of the plant proteins thus supplemented was evaluated. The evaluation was conducted by five skilled panelists, and the smell was evaluated according to the following 11 scales: 0 (equivalent to no addition)↔10 (meat flavor-imparting effect (effect of imparting the fat aroma of meat) is very high). The results are shown in Table 1.

TABLE 1

| Plant protein | Test group 1 | Test group 2 | Test group 3 | Test group 4 | Test group 5 |
|---|---|---|---|---|---|
| Soybean | 100 ppt | — | — | — | — |
| Chickpea | — | 100 ppt | — | — | — |
| Pea | — | — | 100 ppt | — | — |
| Mug bean | — | — | — | 100 ppt | — |
| Broad bean | — | — | — | — | 100 ppt |
| Results (0 to 10) | 7 | 6 | 6 | 5 | 3 |

As a result, meat flavor (fat aroma) was imparted to all the plant proteins. Particularly, in the soybean protein, an effect of effectively masking material-derived grass-like smell was also exerted.

[Test Example 2] Study on Concentration at which (E)-6-nonenal (trans-6-nonenal) Exerts Effect on Soybean Protein Water was added to the soybean protein and kneaded, and (E)-6-nonenal (trans-6-nonenal) was added thereto at varying concentrations. 90 ml of water was added to 10 g of the powdered soybean protein and kneaded, and (E)-6-nonenal (trans-6-nonenal) was added thereto at the concentration of each test group described in Table 2 and further kneaded.

The smell of the plant protein thus supplemented was evaluated. The evaluation was conducted by five skilled panelists, and the smell was evaluated according to the following 11 scales: 0 (equivalent to no addition)↔10 (meat flavor-imparting effect (fat aroma-imparting effect) is very high). The results are shown in Table 2.

TABLE 2

| | Test group 1 | Test group 2 | Test group 3 | Test group 4 | Test group 5 | Test group 6 | Test group 7 | Test group 8 | Test group 9 | Test group 10 |
|---|---|---|---|---|---|---|---|---|---|---|
| (E)-6-nonenal | — | 0.001 ppt | 0.01 ppt | 0.1 ppt | 1 ppt | 10 ppt | 100 ppt | 1 ppb | 10 ppb | 100 ppb |
| Results (0 to 10) | 0 | 0 | 2 | 3 | 5 | 6 | 7 | 5 | 3 | 2 |

A preferred range for addition to the plant protein (soybean protein) was found to be 0.01 ppt to 100 ppb. Further, 1 ppt to 1 ppb was found to be more preferable as the most effective range.

[Test Example 3] Effect of Addition of (Z)-6-nonenal (cis-6-nonenal) on Soybean Protein An effect brought about by the addition of (Z)-6-nonenal (cis-6-nonenal) was tested as a subject to be compared with (E)-6-nonenal. In the same manner as in Test Example 1 using the powdered soybean protein, water was added and kneaded, and (Z)-6-nonenal (cis-6-nonenal) was added thereto at the concentration of each test group described in Table 3 and further kneaded. Sensory evaluation was the same as in Test Example 1. The results are shown in Table 3. Test group 2 was the case of (E)-6-nonenal (trans-6-nonenal).

TABLE 3

| | Test group 1 | Test group 2 | Test group 3 | Test group 4 | Test group 5 |
|---|---|---|---|---|---|
| (E)-6-nonenal | — | 100 ppt | — | — | — |
| (Z)-6-nonenal | — | — | 100 ppt | 1 ppb | 10 ppb |
| Results (0 to 10) | 0 | 7 | 0 | 0 | 0 |

A low (Z)-6-nonenal (cis-6-nonenal) concentration was ineffective, whereas a high concentration offered (Z)-6-nonenal-derived green odor, not meat flavor (fat aroma). Thus, no fat aroma-imparting effect was confirmed.

[Test Example 4] Combination of Flavoring Compounds: Effect of Addition of Flavoring Compound Other than (E)-6-nonenal on Soybean Protein A flavoring compound that increased a fat aroma-imparting effect when used together with (E)-6-nonenal (trans-6-nonenal) was tested. In the same manner as in Test Example 1, water was added to the soybean protein and kneaded, and (E)-6-nonenal was added thereto at the concentration shown in Table 4 while butanoic acid (CAS: 107-92-6) or delta-decalactone (CAS: 705-86-2) was also added thereto and further kneaded. Sensory evaluation was the same as in Test Example 1. The results are shown in Table 4.

TABLE 4

| | Test group 1 | Test group 2 | Test group 3 | Test group 4 | Test group 5 | Test group 6 | Test group 7 |
|---|---|---|---|---|---|---|---|
| (E)-6-nonenal | — | 100 ppt | 10 ppt | 100 ppt | 1 ppb | 100 ppt | 100 ppt |
| butanoic acid | — | — | 1 ppm | 10 ppm | 100 ppm | 10 ppm | — |
| delta-decalactone | | — | 1 ppb | 10 ppb | 100 ppb | — | 10 ppb |
| Results (0 to 10) | 0 | 7 | 8 | 10 | 8 | 9 | 9 |

A meat flavor-imparting effect (fat aroma-imparting effect) got larger by use of (E)-6-nonenal (trans-6-nonenal) in combination with butanoic acid or delta-decalactone.

[Test Example 5] Effect of Addition of Two Flavoring Compounds in Addition to (E)-6-nonenal (trans-6-nonenal) on Patty Using Granular Soybean Protein As described in Table 5, 50 g of a commercially available granular soybean protein was soaked by the addition of water in a 2-fold amount. Then, a 50 g aliquot thereof was collected (corresponding to 17 g of the granular soybean protein and 33 g of water), blended with soy milk, breadcrumbs, chicken egg, salt, palm oil, and flavorings ((E)-6-nonenal, etc.), kneaded, then shaped, and cooked by baking in a frying pan. The cooked product of the soybean protein thus obtained was subjected to sensory evaluation in the same manner as in Test Example 1. The results are shown in Table 6.

TABLE 5

| | Amount blended (g) |
|---|---|
| Granular soybean protein | 17 |
| Water | 33 |
| Sweetened soy milk | 16 |
| Breadcrumbs | 16 |
| Beaten egg | 16 |
| Salt | 1 |
| Palm oil or flavoring | 1 |
| Total | 100 |

TABLE 6

| | Test group 1 | Test group 2 | Test group 3 | Test group 4 |
|---|---|---|---|---|
| (E)-6-nonenal | — | 100 ppt | 10 ppt | 100 ppt |
| butanoic acid | — | — | 1 ppm | 10 ppm |
| delta-decalactone | — | — | 1 ppb | 10 ppb |
| Results (0 to 10) | 0 | 7 | 8 | 10 |

A meat flavor (fat aroma)-imparting effect was also observed in patty using the granular soybean protein as a plant protein, as in the powdered soybean protein used in Test Examples 1 to 4.

[Test Example 6] Combination of Flavoring Compounds: Effect of Addition of Flavoring Compounds Other than (E)-6-nonenal on Soybean Protein+Meat Protein Unlike Test Example 5, patty of the soybean protein supplemented with a meat protein (minced pork), not the soybean protein alone, was used to examine an effect of imparting meat flavor (fat aroma) in the case of adding two flavoring compounds in addition to (E)-6-nonenal.

As described in Table 7, the granular soybean protein as well as minced pork which is meat was added and cooked in the same manner as in Test Example 5. The cooked product of the soybean protein thus obtained was subjected to sensory evaluation in the same manner as in Test Example 1. The results are shown in Table 8.

TABLE 7

| | Amount blended (g) |
|---|---|
| Granular soybean protein | 8.3 |
| Water | 16.7 |
| Minced pork | 25 |
| Sweetened soy milk | 16 |
| Breadcrumbs | 16 |
| Beaten egg | 16 |
| Salt | 1 |
| Palm oil or flavoring | 1 |
| Total | 100 |

TABLE 8

| | Test group 1 | Test group 2 | Test group 3 | Test group 4 |
|---|---|---|---|---|
| (E)-6-nonenal | — | 100 ppt | 10 ppt | 100 ppt |
| butanoic acid | — | — | 1 ppm | 10 ppm |
| delta-decalactone | — | — | 1 ppb | 10 ppb |
| Results (0 to 10) | 2 | 8 | 10 | 10 |

Even when not only the plant protein but the meat protein was contained as a raw material, a meat flavor (fat aroma)-enhancing effect was found to be exerted.

[Test Example 7] Effect of Addition of (E)-6-nonenal as Well as Two Flavoring Compounds when Hot-Air Drying is Performed after Addition In the same manner as in Test Example 5, various components were added to a commercially available granular soybean protein, and flavoring compounds were added at the concentrations described in Table 9 and further kneaded. Then, the patty used was shaped into a sheet (approximately 10 mm×approximately 20 mm×approximately 5 mm), followed by hot-air drying (60° C., 60 min).

The dried product thus obtained by the hot-air drying was soaked by the addition of 100 g of hot water to 10 g and then subjected to sensory evaluation. The sensory evaluation was the same as in Test Example 1. The results are shown in Table 9.

TABLE 9

| | Test group 1 | Test group 2 | Test group 3 |
|---|---|---|---|
| (E)-6-nonenal | — | 1 ppb | 1 ppb |
| butanoic acid | — | — | 100 ppm |
| delta-decalactone | — | — | 100 ppb |
| Results (0 to 10) | 0 | 5 | 7 |

Fat aroma sufficiently remained even after drying, demonstrating that the present invention can be suitably applied to a dry ingredient.

[Test Example 8] Effect Brought about by Post-Addition of (E)-6-nonenal as Well as Two Flavoring Compounds on Dry Ingredients (Containing the Soybean Protein and Pork)

½ soybean protein and ½ pork were used, seasoned with seasonings such as soy sauce and sugar, heated, and dried. The resulting dry ingredients were used to examine an effect of addition of (E)-6-nonenal.

(E)-6-Nonenal as well as two flavorings (butanoic acid and delta-decalactone) were added to the dry ingredients and examined for an effect thereof. The dry ingredients (containing the soybean protein and pork) were soaked by the addition of 100 g of hot water to 10 g and then subjected to sensory evaluation. The sensory evaluation was the same as in Test Example 1. The results are shown in Table 10.

TABLE 10

| | Test group 1 | Test group 2 | Test group 3 |
|---|---|---|---|
| (E)-6-nonenal | — | 100 ppt | 10 ppt |
| butanoic acid | — | — | 1 ppm |
| delta-decalactone | — | — | 1 ppb |
| Results (0 to 10) | 2 | 8 | 10 |

When (E)-6-nonenal was added to the dry ingredients containing the soy bean protein and pork after drying, fat aroma was enhanced even after soaking in hot water, thereby preparing preferred ingredients.

The invention claimed is:

1. A meat flavor-imparting agent for a plant protein-containing food product, comprising (E)-6-nonenal, butanoic acid in a concentration of $10^3$ times to $10^7$ times that of (E)-6-nonenal, and delta-decalactone, in an amount which is no more than 1/100 of an amount of butanoic acid.

2. The meat flavor-imparting agent for a plant protein-containing food product according to claim 1, comprising butanoic acid in a concentration of $10^4$ times to $10^6$ times that of (E)-6-nonenal.

3. The meat flavor-imparting agent for a plant protein-containing food product according to claim 2, wherein said delta-decalactone is in a concentration of 1 to 1,000 times that of (E)-6-nonenal.

4. The meat flavor-imparting agent for a plant protein-containing food product, according to claim 1, wherein said delta-decalactone is in a concentration of 1 to 10,000 times that of (E)-6-nonenal.

5. The meat flavor-imparting agent for a plant protein-containing food product, according to claim 1, wherein a content of (E)-6-nonenal is 0.01 ppt to 100 ppb, based on a weight of a plant protein-containing food.

6. The meat flavor-imparting agent for the plant protein-containing food product according to claim 1, wherein the meat flavor-imparting agent is added to the plant protein-containing food product such that the plant protein-containing food product comprises delta-decalactone in a concentration of from 1 ppb to 100 ppb.

7. A plant protein-containing food product comprising (E)-6-nonenal, and butanoic acid in a concentration of $10^3$ times to $10^7$ times that of (E)-6-nonenal, and delta-decalactone, in an amount which is no more than 1/100 of an amount of butanoic acid, wherein said plant protein-containing food product has a meat flavor.

8. The plant protein-containing food product according to claim 7, wherein the food product is a dry food product.

9. The plant protein-containing food product according to claim 7, comprising delta-decalactone in a concentration of from 1 ppb to 100 ppb.

10. A method for producing a plant protein-containing food product, comprising adding (E)-6-nonenal, and butanoic acid in a concentration of $10^3$ times to $10^7$ times that of (E)-6-nonenal, and delta-decalactone, in an amount which is no more than 1/100 of an amount of butanoic acid, wherein said plant protein-containing food product has a meat flavor.

11. The method for producing a plant protein-containing food product according to claim 10, comprising adding delta-decalactone such that the plant protein-containing food product comprises the delta-decalactone in a concentration of from 1 ppb to 100 ppb.

* * * * *